United States Patent
Daecke et al.

(10) Patent No.: US 7,352,711 B1
(45) Date of Patent: Apr. 1, 2008

(54) CIRCUIT ARRANGEMENT AND METHOD FOR DATA TRANSMISSION

(75) Inventors: Dirk Daecke, Munich (DE); Guenther Schauer, Unterschleissheim (DE); Armin Tannhaeuser, Munich (DE)

(73) Assignee: Infineon Technologies AG, Munich (DE)

( * ) Notice: Subject to any disclaimer, the term of this patent is extended or adjusted under 35 U.S.C. 154(b) by 896 days.

(21) Appl. No.: 09/697,262

(22) Filed: Oct. 26, 2000

(30) Foreign Application Priority Data

Oct. 29, 1999  (DE) ................ 199 52 303

(51) Int. Cl.
*H04L 12/43* (2006.01)
*H04L 12/64* (2006.01)

(52) U.S. Cl. ............... 370/294; 370/442; 370/498; 370/524; 370/532; 370/537; 370/473

(58) Field of Classification Search ........... 370/294, 370/389, 419, 442, 458, 468, 477, 498, 514, 370/524, 532, 537, 473, 474; 375/222
See application file for complete search history.

(56) References Cited

U.S. PATENT DOCUMENTS

| | | | |
|---|---|---|---|
| 5,448,635 A | 9/1995 | Biehl et al. | |
| 5,909,445 A | 6/1999 | Schneider | |
| 6,208,637 B1 * | 3/2001 | Eames | 370/352 |
| 6,215,855 B1 * | 4/2001 | Schneider | 379/22 |
| 6,282,238 B1 * | 8/2001 | Landry | 375/222 |
| 6,324,212 B1 * | 11/2001 | Jenness | 375/222 |
| 6,374,288 B1 * | 4/2002 | Bhagavath et al. | 709/203 |
| 6,400,708 B1 * | 6/2002 | Bartholomew et al. | 370/352 |
| 6,404,774 B1 * | 6/2002 | Jenness | 370/465 |
| 6,452,923 B1 * | 9/2002 | Gerszberg et al. | 370/352 |
| 6,480,487 B1 * | 11/2002 | Wegleitner et al. | 370/354 |
| 6,522,666 B1 * | 2/2003 | Tzannes et al. | 370/471 |
| 6,590,904 B1 * | 7/2003 | Williams | 370/466 |
| 6,693,916 B1 * | 2/2004 | Chaplik et al. | 370/485 |
| 6,747,995 B1 * | 6/2004 | Brown et al. | 370/493 |
| 6,760,383 B1 * | 7/2004 | Darveau | 375/259 |
| 6,804,267 B1 * | 10/2004 | Long et al. | 370/524 |
| 6,853,647 B1 * | 2/2005 | Rawson et al. | 370/463 |
| 6,882,657 B1 | 4/2005 | Werner et al. | |
| 6,904,083 B2 * | 6/2005 | Young et al. | 375/222 |
| 6,990,093 B1 * | 1/2006 | Rantalainen et al. | 370/350 |

(Continued)

FOREIGN PATENT DOCUMENTS

DE      197 06 081      8/1998

(Continued)

OTHER PUBLICATIONS

ETSI Technical Report ETR 080, "Transmission and Multiplexing TM; Integrated Services Digital Network (ISDN) Basic Rate Access; Digital Transmission System on Metallic Local Lines," Nov. 1996.

*Primary Examiner*—Chi Pham
*Assistant Examiner*—Ahmed Elallam
(74) *Attorney, Agent, or Firm*—Schiff Hardin LLP

(57) ABSTRACT

In the inventive circuit arrangement and appertaining method, data of at least respectively one ISDN data connection, a traditional telephone connection as well as of a broadband data connection are transmitted in an SDSL frame of an SDSL data connection, where the necessary control data are suitably transmitted in the overhead of the SDSL frame.

17 Claims, 5 Drawing Sheets

U.S. PATENT DOCUMENTS

| | | | |
|---|---|---|---|
| 2002/0114045 A1* | 8/2002 | Doucet et al. | 359/172 |
| 2003/0174735 A1* | 9/2003 | Daecke et al. | 370/524 |
| 2004/0081233 A1* | 4/2004 | Bremer et al. | 375/222 |
| 2004/0146068 A1* | 7/2004 | Chaplik et al. | 370/485 |
| 2004/0179552 A1* | 9/2004 | Palm | 370/480 |
| 2005/0129103 A1* | 6/2005 | Palm | 375/222 |

FOREIGN PATENT DOCUMENTS

| | | |
|---|---|---|
| DE | 198 02 600 | 8/1999 |
| WO | WO 99/21311 | 4/1999 |

* cited by examiner

| Eoc -Message- encoding: | Message Byte 1 | Message Byte 2 |
|---|---|---|
| Service -ID (e.g. ISDN) | Service -No. (for example, selection of an ISDN connection) | Signalling for operational purposes |

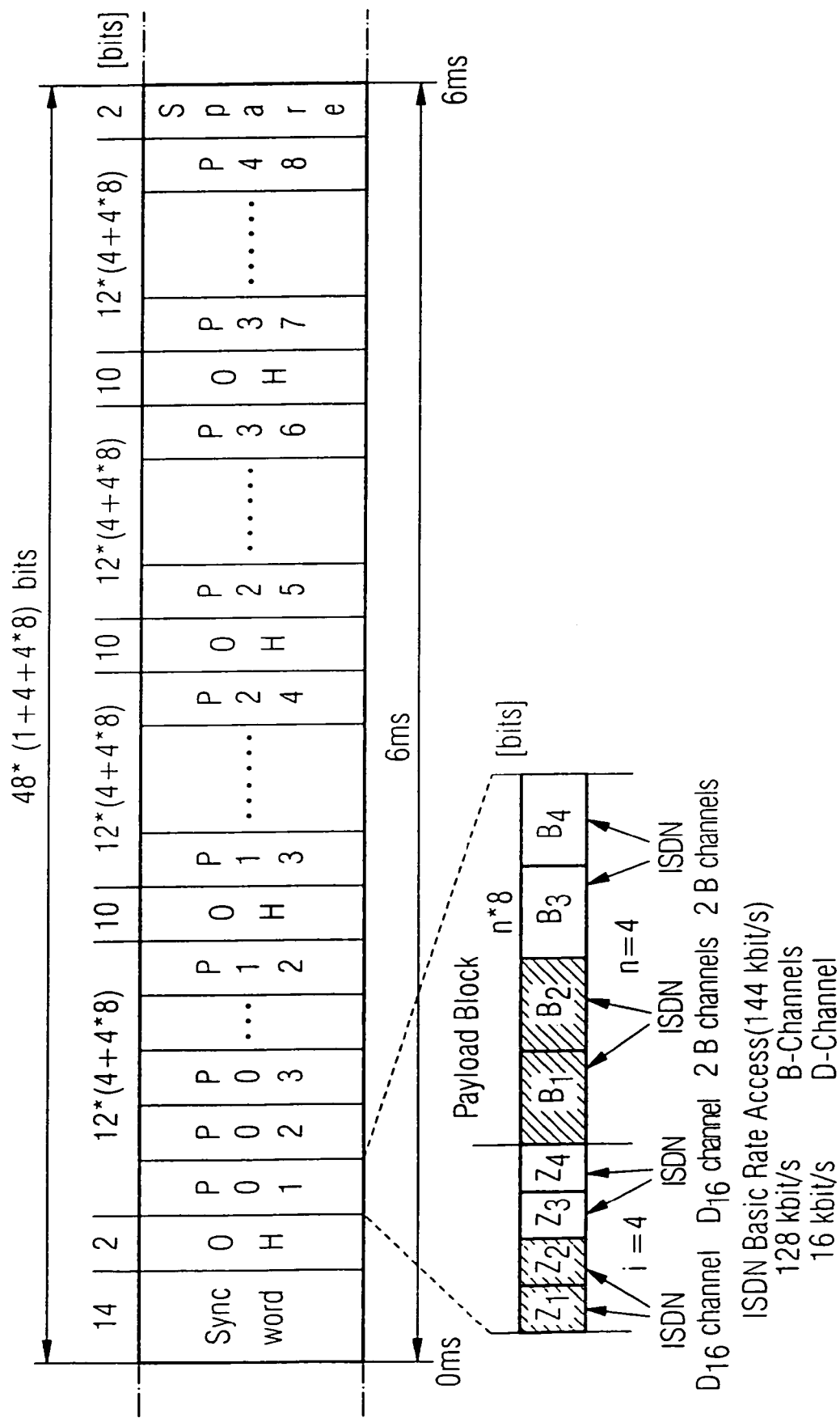

CIRCUIT ARRANGEMENT AND METHOD FOR DATA TRANSMISSION

BACKGROUND OF THE INVENTION

1. Field of the Invention

The invention relates to a circuit arrangement with a transmission unit for inserting data belonging to a terminal equipment in a frame, a circuit arrangement with a reception unit for dividing a transmitted datastream to a terminal equipment type, and a method for transmitting a data stream in a frame belonging to a terminal equipment type.

2. Description of the Related Art

In a particular network environment, a payload data rate of 144 kbit/s is offered for a subscriber within an ISDN service data network connection. This payload data rate is divided for a first and second payload data channel of 64 kbit/s each as well as for a signaling channel with 16 kbit/s. 12 kbit/s for frame words as well as an overhead channel with 4 kbit/s are required within the ISDN frame for these channels that form the payload region of an ISDN frame.

In the classic ISDN basic access, a two-wire data connecting path is employed exclusively for this ISDN service (see FIG. 1). In order to be able to utilize two-wire data connection paths between a network node and a network termination at the subscriber better, data of an ISDN connection are inserted in an approximate time-related manner, for example, in an HDSL high-speed digital subscriber line frame (see FIG. 2). A data transport with an SDSL frame is considered for the following observations. In addition to data of an ISDN connection, further data such as those of an Ethernet connection are also transmitted within a payload region.

SUMMARY OF THE INVENTION

The invention is based on the object of specifying a further circuit arrangement and an appertaining method for multiple utilization of a data connection.

The stated object is inventively achieved by a circuit arrangement, comprising a transmission unit for inserting data belonging to at least one terminal equipment type in a frame, the transmission unit comprising an insertion mechanism for inserting the data of the terminal equipment of the terminal equipment types, the data of all terminal equipment types being synchronously inserted into the frame and transmitted with a digital time-division multiplex technique.

This object is also achieved by a circuit arrangement, comprising a reception unit for dividing a datastream transmitted in a frame by a transmitter to at least one terminal equipment type; and a switch module for a purpose-conforming division of the datastream, in which a further division onto further terminal equipment of a terminal equipment type is undertaken based on control data.

Finally, the object is also achieved by a method for transmitting a data stream in a frame belonging to at least one terminal equipment type, comprising the steps of synchronously inserting data of all terminal equipment types into the frame in a first unit; transmitting the data to a second unit with a time-division multiplex method; and dividing the data stream to terminal devices of at least one terminal equipment type in the second unit.

The invention has a number of advantages:

1) a plurality of ISDN connections can be arranged within a payload region of an SDSL symmetric digital subscriber line frame. The payload region can also be referred to as a payload data region of an SDSL frame;

2) the bandwidth of the payload region can be expanded by a relocation of operational bits;

3) a traditional telephony connection, instead of the ISDN connection, can be synchronously transmitted in the SDSL frame, for example, together with an Ethernet connection;

4) a plurality of traditional telephony connections, instead of the plurality of ISDN connections, can be transmitted in the SDSL frame;

5) the bandwidth of the payload region can be expanded by relocating operational bits, in the case of traditional telephony connections as well.

6) the available bandwidth of the eoc channel can be utilized better due to the accommodation of the information content of the operational bits in the eoc channel present in the SDSL frame in the form of suitable messages.

7) the plurality of possible, different services, for example, given a plurality of transmitted ISDN connections, are addressable on the basis of a suitable expansion of the eoc message format, for example, by inserting an eoc sub-address.

Additional advantageous developments of the circuit arrangement and of the method are discussed below.

BRIEF DESCRIPTION OF THE DRAWINGS

The following more detailed explanation of an exemplary embodiment provides other characteristics of the invention on the basis of drawings.

FIG. 6 is a data structure diagram showing a further division of an SDSL frame.

DESCRIPTION OF THE PREFERRED EMBODIMENTS

Figure 1:
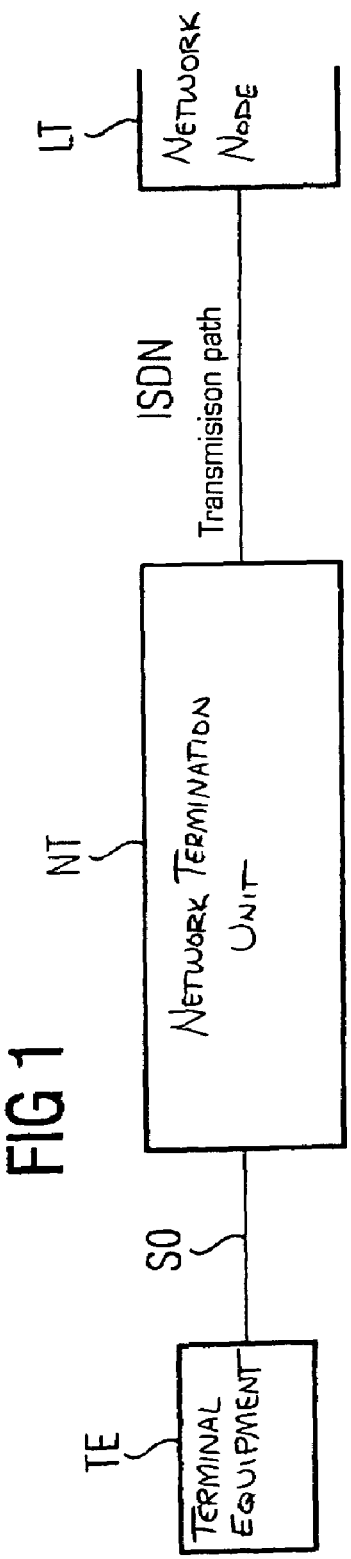
FIG. 1 is a block diagram showing an embodiment of an ISDN connection.

FIG. 1 shows an ISDN connecting path between a terminal equipment TE and a network node LT. Two-wire trunks are employed between a network node LT particularly fashioned as switching node and a network termination unit NT arranged, for example, at the subscriber.

Figure 2:
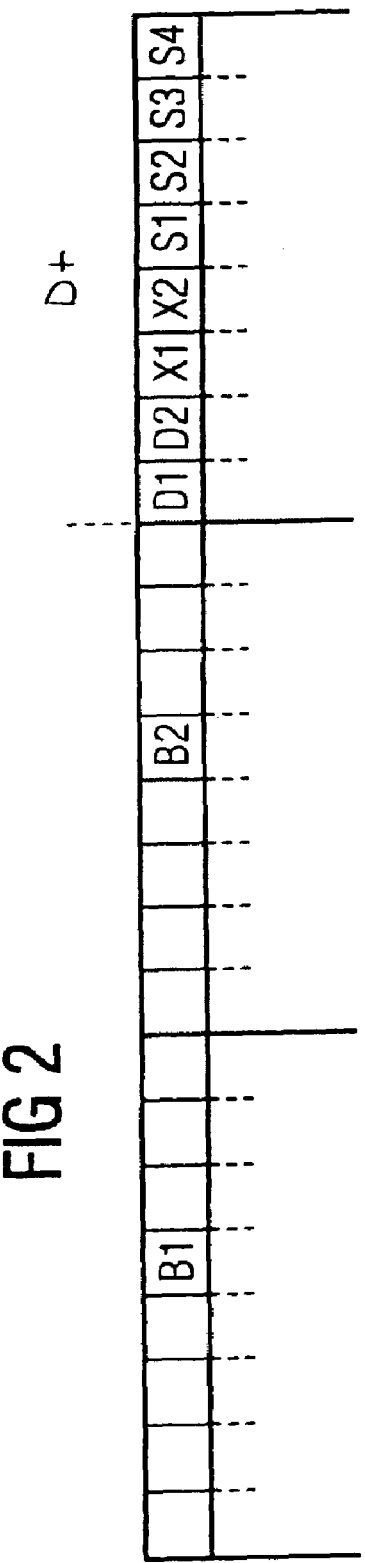
FIG. 2 is a data structure diagram showing a division of an ISDN basic data frame given plesiochronic transmission in an HDSL frame.

FIG. 2 shows a division of an ISDN channel given plesiochronic transmission in an HDSL frame. This ISDN channel comprises a first and second user channel B1, B2 as well as a signaling channel D+. The channels B1, B2 and D+ have a respective width of one byte. The division of the channel D+ is as follows: bits D1 and D2 are for ISDN signaling, X1, X2, S1, S2, S3 and S4 are reserved for operational purposes (for example, activation, etc.).

Figure 3:
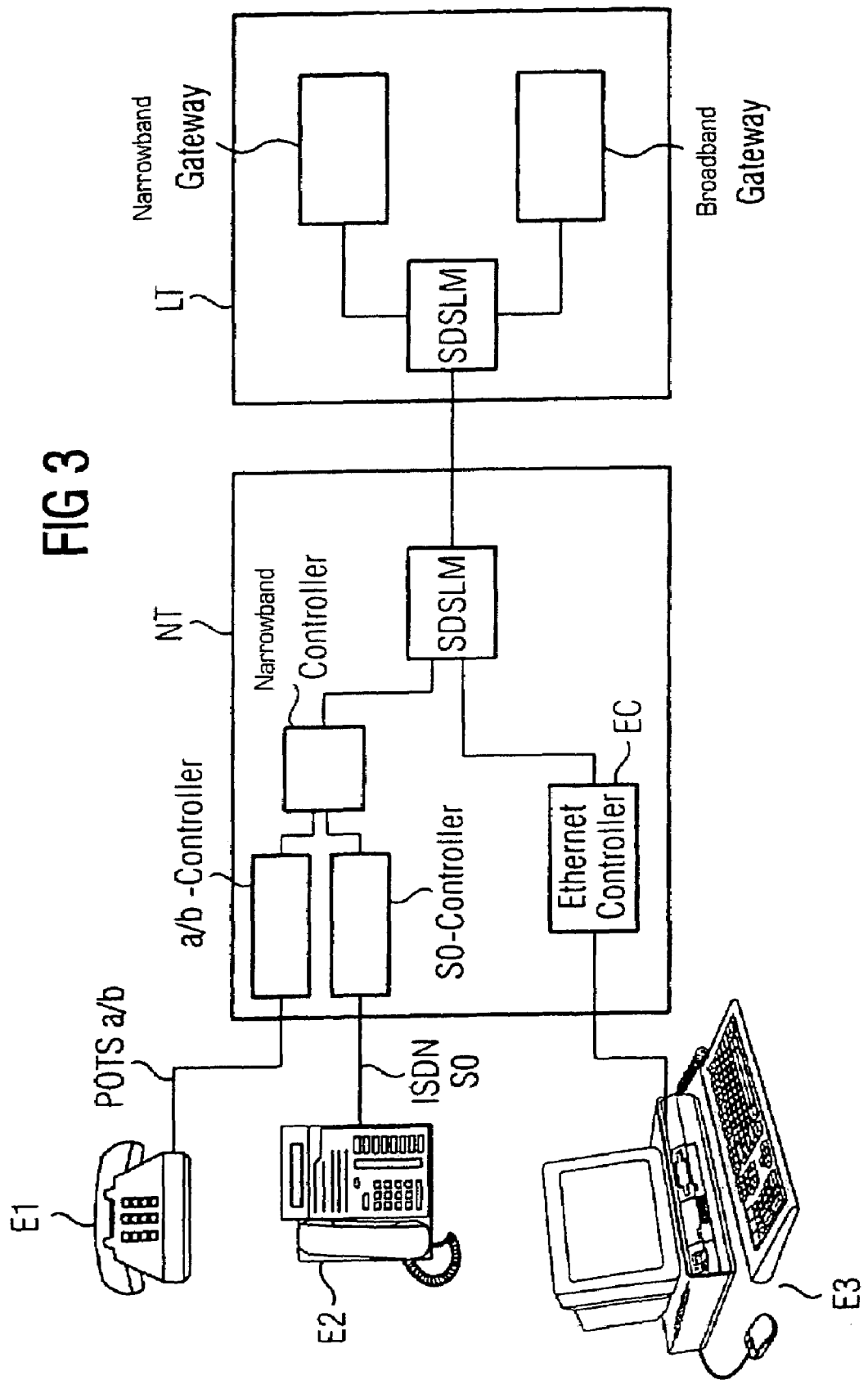
FIG. 3 is a schematic block diagram showing an embodiment of a network termination.

FIG. 3 shows an SDSL symmetric digital subscriber line connection between a second unit NT, a network node, and terminal equipment E1, E2 and E3. In the network node LT, the data for the terminal equipment are taken from or, respectively, supplied to a narrow band and broadband network via corresponding gateways and are combined in the SDSL frame. The narrow band and broadband data of the SDSL frame are transmitted synchronously in time-division multiplex between a first unit LT, a network node and the network termination NT.

The merging at the transmission side and the division at the reception side of the data belonging to the narrow or/and broadband network is implemented in the module SDSLM, which can also be referred to as a transmission-reception device, according to known methods of digital time-division multiplex technology. The broadband data are forwarded to an Ethernet controller EC in the network termination NT. The narrow band data are forwarded to a narrow band controller that forwards the relevant data to the following a/b controller for the traditional telephone connection or to the S0 controller for the ISDN connection.

An Ethernet terminal equipment as well as one or more ISDN systems or one or more traditional telephone sets can be connected to the network termination unit NT. For example, the terminal equipment type E1 is a traditional telephone, the terminal equipment type E2, alternatively, is an ISDN system, and the terminal equipment type E3 is, for example, a data processing system.

The data transmission of the data in an SDSL frame occurs synchronously in time-division multiplex. The synchronization takes place with the assistance of the SDSL clock. The frame word of the ISDN frame can be eliminated in a transmission of the SDSL frame. The information contained in the overhead channel in the ISDN connection such as status information or a transmission control are already contained in the SDSL frame. Among other things, an eoc channel, also be referred to as an "operating channel", and that is synchronized with the ISDN data stream, is provided in the ISDN overhead channel. This eoc channel serves as the control channel between network equipment for operational purposes.

Figure 4:
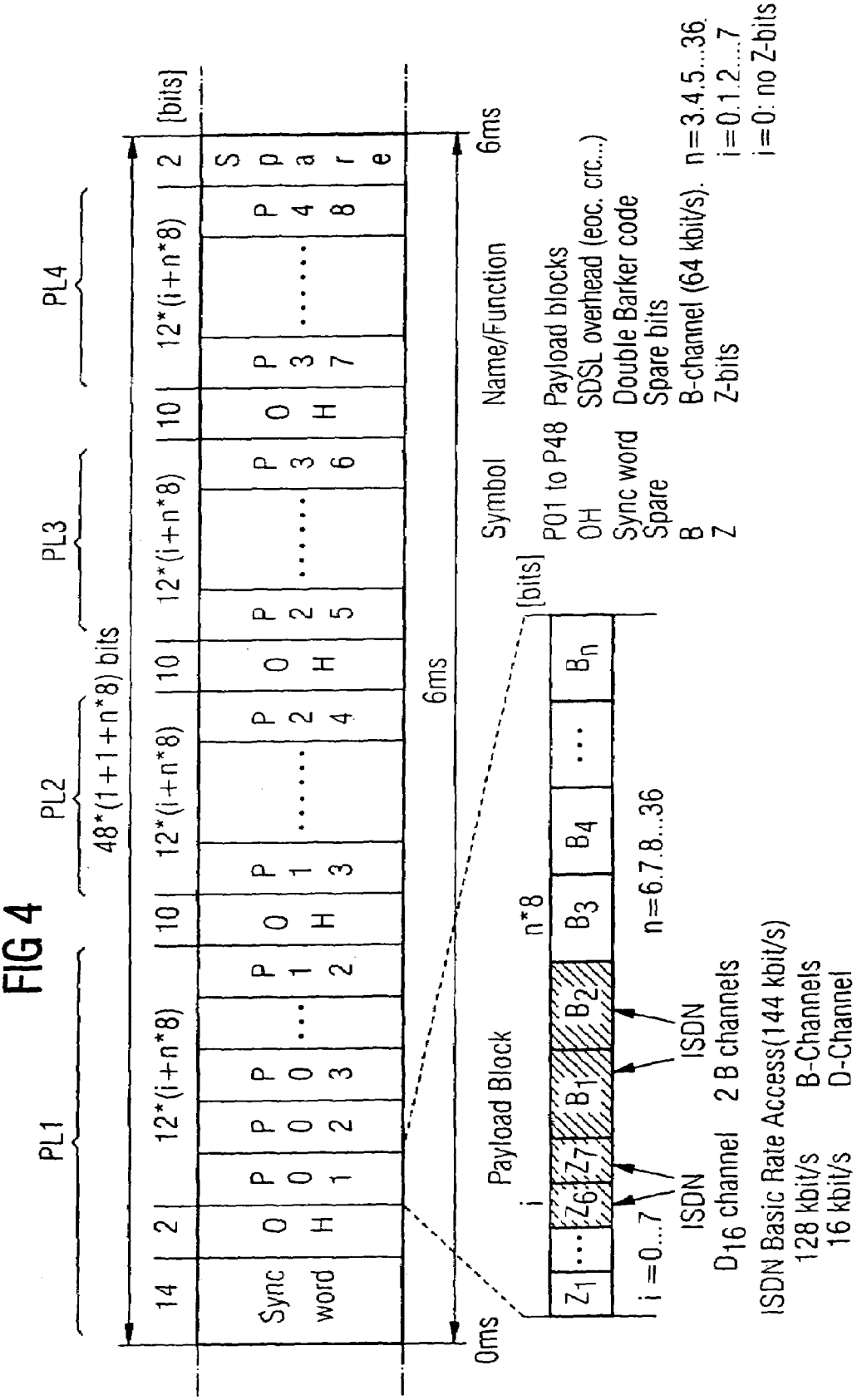
FIG. 4 is a data structure diagram showing a division of an SDSL frame.

FIG. 4 shows the division of an SDSL frame. The SDSL frame is preferably divided into four payload blocks PL1, PL2, PL3 and PL4. Each payload block PL1, PL2, PL3 and PL4 can be sub-divided into twelve sub-blocks P01 through P12. Each sub-block is divided into an information part and into a payload data region. The data of the B1 and B2 channel of an ISDN connection are combined in two 64 kbit/s B-channels of an SDSL connection; the signaling data of the D-channel are preferably combined in two 8 kbit/s Z-channels. The further region of the sub-blocks of the SDSL frame is employed for further payload data, for example, of an Ethernet connection.

The SDSL overhead data are accommodated in the overhead section OH of the SDSL frame, these containing status information and an embedded control channel or operating channel (eoc channel) for the operation of the SDSL transmission link.

Furthermore, the start of the SDSL frame contains the 14-bit wide frame word (sync word) for the synchronization and two unused bits (spare) at the frame end.

Figures 5, 7:
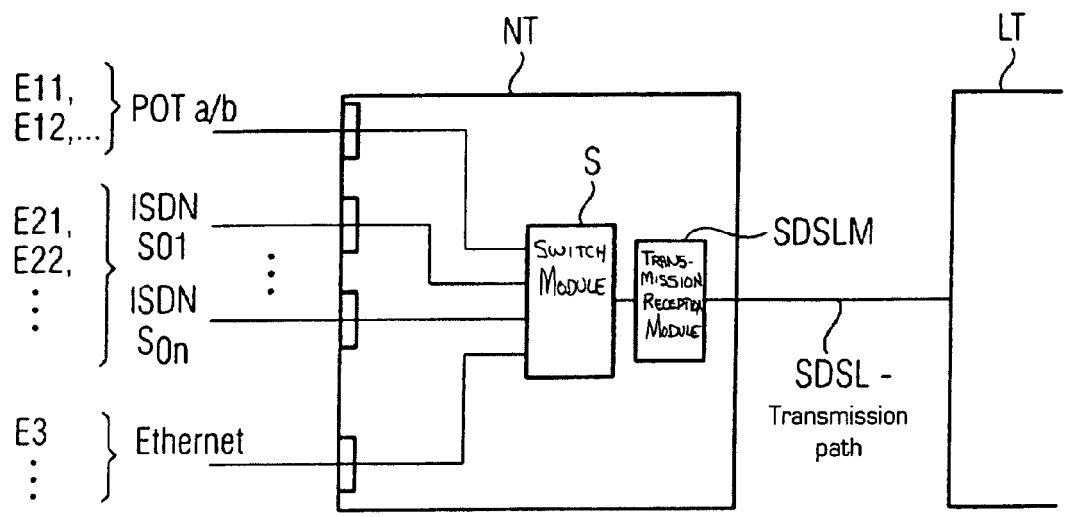
FIG. 5 is a schematic block diagram showing a further embodiment of a network termination.
FIG. 7 is a data structure diagram showing an addressing field.

In FIG. 5, the embodiment of an SDSL data transmission shown in FIG. 3 is expanded by a switch module S. This switch module S selects the data of various channels combined in the SDSL frame and conducts these to the corresponding terminal. This switch module contains the necessary controllers that make the transmitted connection types available to the subscriber in a suitable way.

FIG. 6 shows a further division of a payload region within an SDSL frame. The signaling information of the D-channel of a first ISDN connection SO1 and those of a second ISDN connection SO2 are transmitted in this in the regions referenced Z1, Z2 and Z3, Z4. The payload data of the first and second ISDN connection SO1, SO2 are transmitted in the regions B1 through B4. The regions Z1, Z2 and B1, B2 are allocated to the first ISDN connection, and the regions Z3, Z4 and B3, B4 are allocated to the second ISDN connection. The operational control information of the respective ISDN connection are transmitted in the overhead OH of the SDSL frame, where this control information is divided into a part relating to the SDSL transmission path and into a further part that is dependent on one or more transmitted services.

FIG. 7 shows an embodiment of the eoc address expansion necessary for the addressing of the individual ISDN connections or, respectively, traditional telephone connections. To this end, the address of the eoc channel has an auxiliary address field attached to it. This auxiliary address field comprises the components service-ID and service-No that are needed for an unambiguous addressing of the respective connection.

For embedding this expansion into the previously existing message strategy for the eoc channel within an SDSL frame, a message encoding, for example, that was previously unused is used in order to transmit existing signaling for operational purposes for exactly one type of service (for example, ISDN). A specific service number within a service type (for example, one of a plurality of ISDN connections) is addressed in a following field that lies in the parameter region of this message encoding. In the same way, a further message encoding that is still free can be employed for traditional telephone connections.

The above-described method and arrangement are illustrative of the principles of the present invention. Numerous modifications and adaptations thereof will be readily apparent to those skilled in this art without departing from the spirit and scope of the present invention.

What is claimed is:

1. A circuit arrangement, comprising:
a transmission unit for inserting data belonging to at least two terminal equipment types or services that are capable of including both voice and data in a common frame having a frame length, said transmission unit comprising an insertion mechanism for inserting said data of the at least two terminal equipment types, said data of all terminal equipment types being synchronously inserted into said common frame with a common channel for operational control and transmitted with a digital time-division multiplex technique.

2. A circuit arrangement, comprising:
a reception unit for dividing a datastream transmitted in a common frame with a common channel for operational control, said common frame comprising data belonging to at least two terminal equipment types or services that are capable of including both voice and data, said data of all terminal equipment types being data synchronously inserted into said common frame with a common channel for operational control, by a transmitter to at least one terminal equipment type of said at least two terminal equipment types; and
a switch module for a purpose-conforming division of said data stream synchronously transmitted in said common frame, in which a further division onto further terminal equipment of said at least two terminal equipment types or services is undertaken based on control data.

3. A circuit arrangement, comprising a transmission-reception unit which comprises said transmission unit of claim 1, and said reception unit of claim 2.

4. The circuit arrangement according to claim 1, wherein the common frame is an SDSL frame.

5. The circuit arrangement according to claim 4, wherein the data belonging to at least two terminal equipment types or services are provided within an ISDN service that are transmitted inside of the SDSL frame.

6. A method for transmitting a data stream in a common frame with a common channel for operational control belonging to at least two terminal equipment types or services that are capable of including both voice and data, comprising the steps of:
synchronously inserting data of said at least two terminal equipment types or services into said common frame in a first unit;
transmitting said data to a second unit with a time-division multiplex method; and
dividing said data stream in said common frame to terminal devices of at least two terminal equipment types or services in said second unit.

7. A method according to claim 6, further comprising the step of depositing data for operational control of connections to which at least two terminal equipment types or services that is capable of including both voice and data are connected in a single operating eoc channel of said frame.

8. A method according to claim 7, wherein said connections are telephony connections, ISDN connections or broadband connections.

9. A method according to claim 6, further comprising the step of filling a payload data region available in a frame in a terminal equipment-specific manner depending on a transmission rate of a transmission link.

10. A method according to claim 6, further comprising the step of connecting a plurality of terminal equipment of at least one terminal equipment type to a transmission-reception unit.

11. A method according to claim 6, further comprising the steps of:
providing bits for operational control in said data belonging to said terminal equipment types or services; and
arranging said bits outside of a payload data region provided for said terminal types or services.

12. A method according to claim 11, wherein said bits for operational control are arranged in an overhead of said frame.

13. A method according to claim 12, further comprising the steps of:
allocating said bits for operational control to an operating eoc channel; and
addressing said bits for operational control via a sub-address in a message format of said operating channel.

14. A method according to claim 6, further comprising the step of accepting data of a plurality of ISDN connections in said frame, said frame being a symmetric digital subscriber line frame.

15. A method according to claim 6, further comprising the step of accepting data of a plurality of traditional telephony connections in said frame, said frame being a symmetric digital subscriber line frame.

16. A method according to claim 6, wherein said step of transmitting said data comprises transmitting said data of a symmetric digital subscriber line frame synchronously on a transmission link between said first unit, which is a network node, and said second unit, which is a network termination unit with a time-division multiplex method.

17. A method for transmitting a data stream in a common frame with a common channel for operational control belonging to at least two terminal equipment types or services that are capable of including both voice and data, comprising the steps of:
synchronously inserting data of said at least two terminal equipment types or services into said common frame in a first unit;
synchronously transmitting said data to a second unit with a time-division multiplex method; and
dividing said data stream of said common frame to terminal devices of at least two terminal equipment types or services in said second unit.

* * * * *